United States Patent [19]

Schaaf et al.

[11] 4,371,039
[45] Feb. 1, 1983

[54] TOOL BAR CONTROL FOR AGRICULTURAL IMPLEMENT

[75] Inventors: Wayne J. Schaaf; Bennie J. Boswell, both of Kewanee, Ill.

[73] Assignee: Chromalloy American Corporation, St. Louis, Mo.

[21] Appl. No.: 253,571

[22] Filed: Apr. 13, 1981

[51] Int. Cl.³ .................... A01B 63/22; A01B 63/32
[52] U.S. Cl. .................................. 172/244; 172/398; 172/501; 172/482
[58] Field of Search ............... 172/398, 397, 501, 482, 172/244

[56] References Cited

U.S. PATENT DOCUMENTS

| | | | |
|---|---|---|---|
| 3,006,422 | 10/1961 | Mighell | 172/398 |
| 3,255,839 | 12/1965 | Petitt | 172/398 |
| 3,828,860 | 8/1974 | Poland | 172/311 |

Primary Examiner—Richard J. Johnson
Attorney, Agent, or Firm—Haverstock, Garrett & Roberts

[57] ABSTRACT

A tool bar control mechanism for an agricultural implement or the like having a frame, a pair of generally transverse tool bars mounted on the frame for rotation about their longitudinal axes and carrying ground working tools such as spring teeth for movement therewith, and transport wheels mounted on the frame and movable between lowered transport positions wherein the frame and ground working tools are raised for transport and raised positions wherein the frame and tools are lowered for ground working operation, the tool bar control mechanism including linkage means operatively interconnecting the transport wheels with the tool bars so as to effect predetermined rotation of the tool bars and ground working tools in response to movement of the transport wheels between their lowered and raised positions and positively maintain the tools in set position during ground working operation.

10 Claims, 4 Drawing Figures

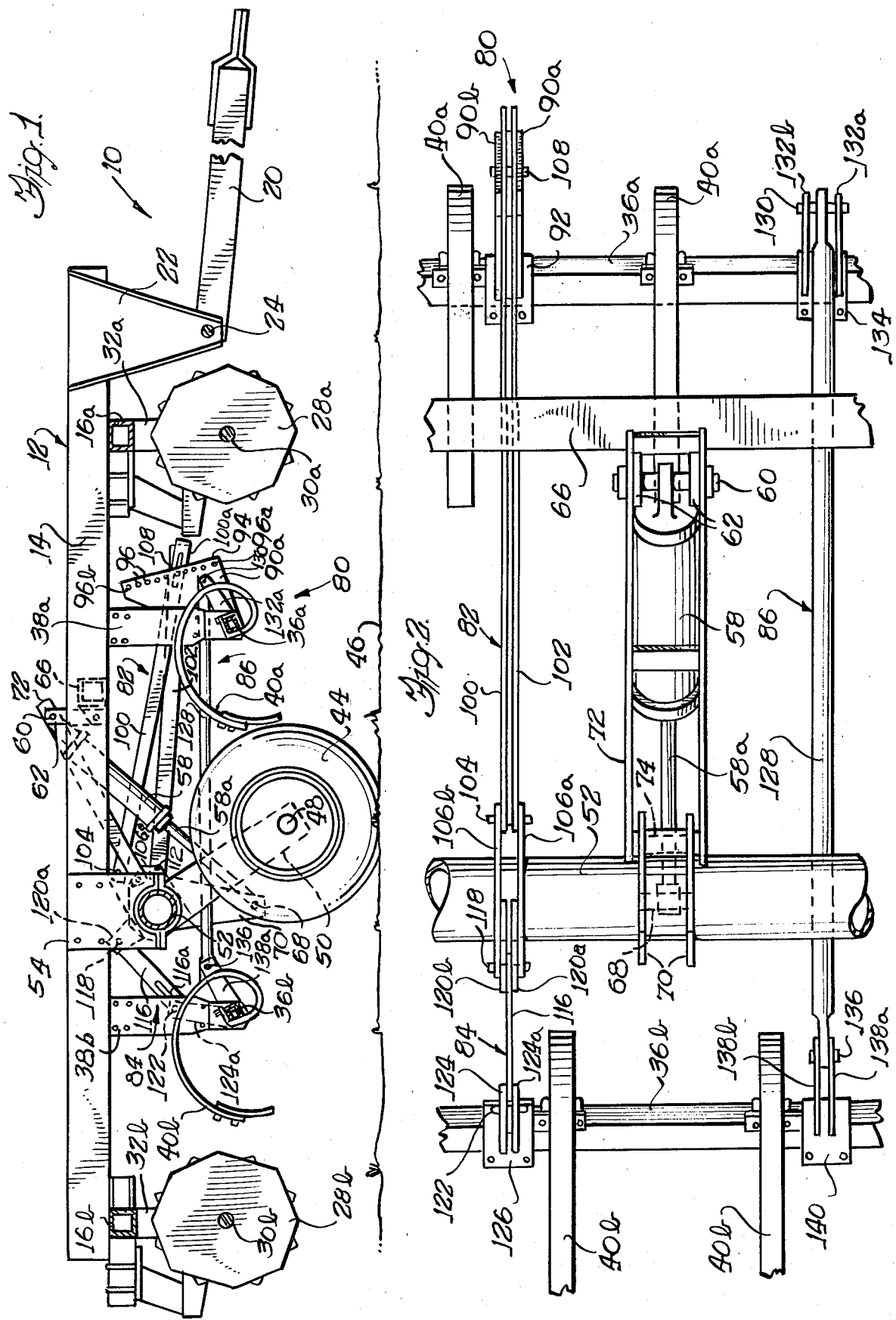

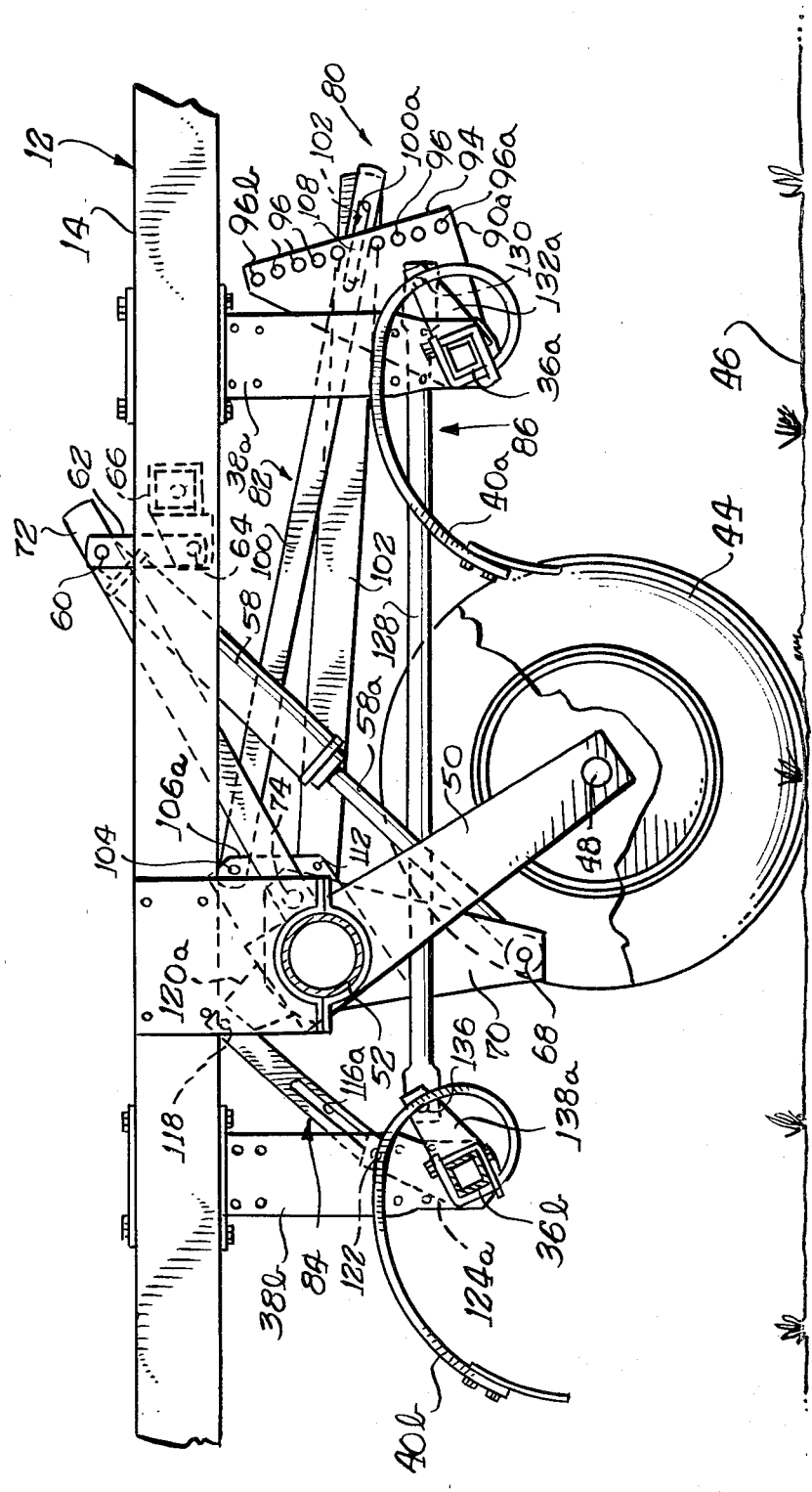

TOOL BAR CONTROL FOR AGRICULTURAL IMPLEMENT

The present invention relates generally to agricultural implements, and more particularly to a novel tool bar control mechanism for use with a wheeled agricultural implement having a frame on which is mounted at least one pair of rotatable tool bars carrying ground working tools, and transport wheels movable between lowered positions raising the frame and tools for transport and raised positions wherein the frame and tools are lowered for ground working operation, the tool bar control mechanism being adapted to effect predetermined rotation of the tool bars in response to movement of the transport wheels between their lowered and raised positions and being operative to maintain the tool bars in set position during ground working operation.

In agricultural implements such as mulchers and the like having a frame carrying ground working tools thereon, it is common practice to provide transport wheels on the frame which are movable between lowered transport positions wherein the frame and ground working tools are raised for transport and raised positions wherein the frame and tools are lowered for ground working operation. In such implements which carry transverse tool bars having spring teeth thereon, it is known to employ linkage mechanism to interconnect the tool bars to a rockshaft or pivot shaft on which the transport wheels are mounted so as to effect predetermined rotation of the tool bars and spring teeth in response to movement of the transport wheels between their lowered and raised positions. See, for example, U.S. Pat. Nos. 3,006,422 and 3,838,860.

A general object of the present invention is to provide a tool bar control mechanism for an agricultural implement having transport wheels movable between lowered transport positions and raised positions wherein the tool bars and associated tools are lowered for ground working operation, which control mechanism includes novel linkage mechanism interconnecting the tool bars to the transport wheels so as to effect predetermined rotation of the tool bars in response to raising and lowering of the transport wheels.

A more particular object of the present invention is to provide a novel tool bar control linkage for a wheeled agricultural implement having a pair of rotatable generally transverse tool bars carrying spring teeth thereon, the tool bar control mechanism including first linkage means having lost motion connection to one of the tool bars and adapted to effect predetermined rotation thereof in response to movement of the transport wheels from their lowered to their raised positions, second linkage means having lost motion connection with the other tool bar and operative to effect positive predetermined reverse rotation of the associated tool bar in response to movement of the transport wheels from their raised to their lowered positions, and third linkage means directly interconnecting the tool bars so that rotation of one of the tool bars effects a corresponding rotation of the other tool bar.

A feature of the present invention lies in the provision of first linkage means in the form of two actuator links pivotally connected at first ends to the rockshaft on which the transport wheels are mounted and having their opposite ends connected through lost motion connections to one of the tool bars so that a first one of the actuator links effects rotation of the associated tool bar during raising of the transport wheels and the other of the actuator links limits the extent of such rotation and cooperates with the first actuator link to set the tool bars in predetermined rotational positions when the transport wheels are raised.

Another feature of the present invention lies in the provision of second linkage means in the form of a single control link pivotally connected at one end to the rockshaft and having lost motion connection with the other of the tool bars so as to enable free rotation of the associated tool bar under the influence of the first and third linkage means when the transport wheels are moved from their lowered to raised positions, but being operative to effect a positive predetermined reverse rotation of the tool bars in response to movement of the transport wheels from raised to lowered positions.

Further objects and advantages of the invention, together with the organization and manner of operation thereof, will become apparent from the following detailed description of the invention when taken in conjunction with the accompanying drawings wherein like reference numerals designate like elements throughout the several views, and wherein:

FIG. 1 is a longitudinal sectional view of an agricultural implement employing tool bar control mechanism in accordance with the present invention;

FIG. 2 is a fragmentary plan view, on an enlarged scale, of the implement illustrated in FIG. 1;

Figure 4:
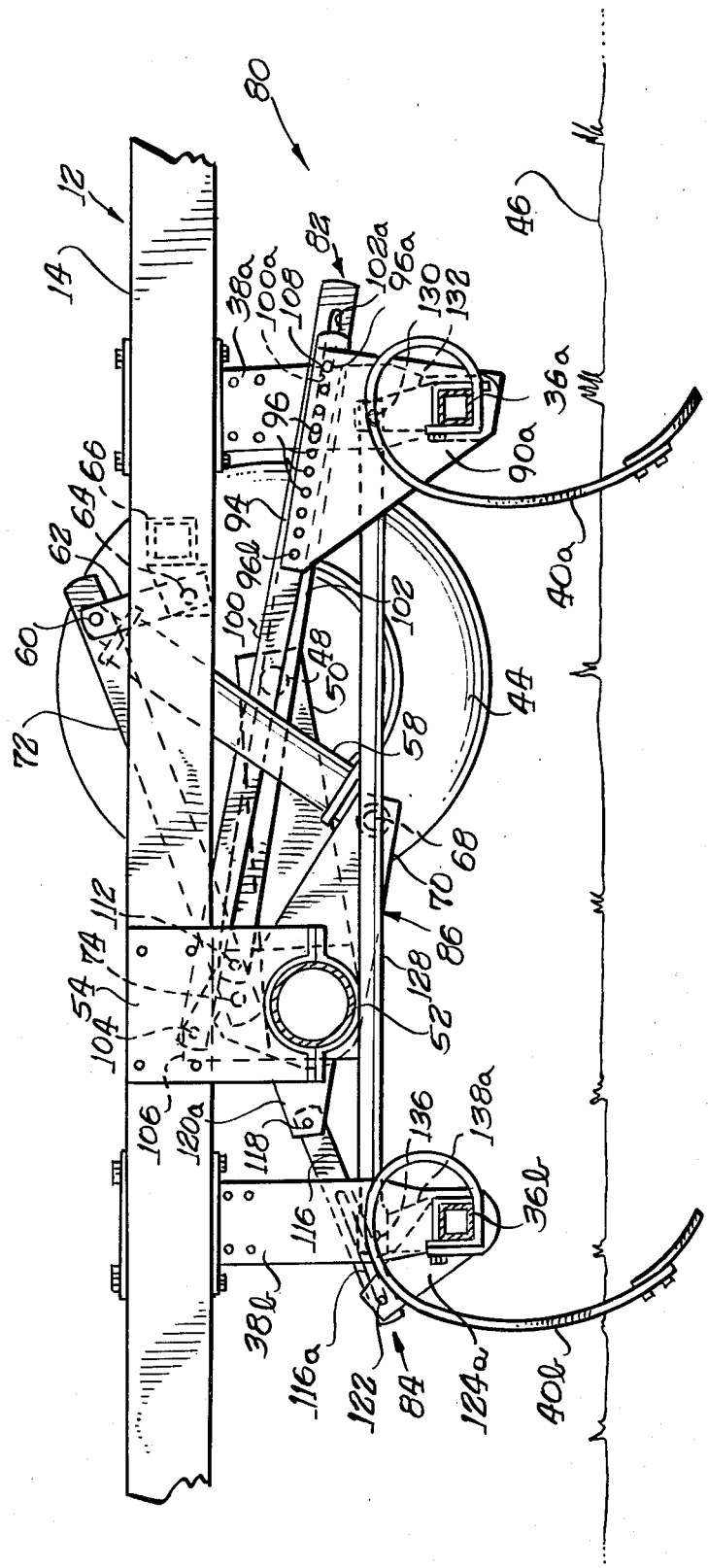

FIG. 3 is a fragmentary longitudinal sectional view, on an enlarged scale, of the implement illustrated in FIG. 1 and showing the transport wheels in their lowered transport positions; and FIG. 4 is a fragmentary longitudinal sectional view similar to FIG. 3 but showing the transport wheels in raised positions and the tool bars and associated ground working spring teeth rotated for maximum penetration.

Referring now to the drawings, the present invention is illustrated, by way of example, as being employed in an agricultural implement indicated generally at 10. In the described embodiment, the agricultural implement 10 comprises a mulcher conventionally employed to prepare soils for seeding so as to provide a firm, uniform, level and smooth seedbed. To this end, the implement 10 includes frame means, indicated generally at 12, which includes a plurality of longitudinally extending frame members, one of which is shown at 14, secured at their forward and rearward ends to transverse frame members 16a and 16b so as to form a generally rectangular rigid framework. Hitch means in the form of a generally A-shaped hitch bar or tongue 20 is mounted on the frame means through depending brackets, one of which is indicated at 22, for pivotal or hinged movement about a hinge axis 24 and provides means for connecting the implement to a draft vehicle such as a tractor or the like in a known manner.

The frame means 12 supports ground working tools which, in the illustrated mulcher, comprise forward and rear gangs of rollers 28a and 28b, respectively, which have associated axial support shafts 30a and 30b journaled at their opposite ends to depending support brackets such as shown at 32a and 32b. The support brackets 32a,b are fixed to the transverse frame members 16a and 16b, respectively, so that the roller gangs are disposed in transverse relation to the frame means 12.

In addition to the roller gangs 28a and 28b, the frame means 12 also has a pair a parallel spaced tool support bars 36a and 36b rotatably supported thereon in generally transverse relation to the frame means so as to lie between the forward and rear roller gangs in generally parallel relation therewith. The tool support bars 36a,b have their opposite ends rotatably supported or journaled on the lower ends of depending support brackets, two of which are indicated at 38a and 38b, which are fixed at their upper ends to the frame means in a suitable manner. The tool support bars 36a,b are mounted on the frame means 12 such that their longitudinal axes are generally coplanar with the axes 30a,b of the roller gangs 28a,b and each tool bar carries earth working tools in the form of a plurality of laterally spaced spring teeth such as shown at 40a and 40b. The tool support bars 36a,b are preferably rectangular in transverse cross section and facilitate mounting of the spring teeth thereon in a known manner so that the spring teeth rotate with the respective tool support bars, as will be more fully described hereinbelow.

To facilitate raising of the frame means 12 and ground working tools carried thereon during transport of the implement between fields or during sharp turn-arounds, transport wheel means in the form of at least one pair of laterally spaced transport wheels, one of which is indicated at 44, are mounted on the frame means 12 for movement between lowered transport positions, as shown in FIGS. 1 and 3, wherein the frame means 12 and associated ground working tools 28a,b and 40a,b are raised above the ground surface, such as indicated at 46 in FIG. 1, for transport, and raised positions, as illustrated in FIG. 4, wherein the frame means and associated ground working tools are lowered for ground working operation. The transport wheels 44 are rotatably mounted on transverse axles 48 carried on the lower ends of radial support arms, one of which is shown at 50, fixed at their upper ends on a transverse cylindrical tubular rockshaft 52 which is journaled on depending support brackets, one of which is indicated at 54, fixed to associated longitudinal frame members, such as 14, of the frame means 12.

Operator means in the form of a double acting fluid pressure operated cylinder or ram 58 is operatively associated with the transport wheels 44 and adapted to move the transport wheels between their lowered and raised positions. The cylinder or ram 58 has its upper cylinder end pivotally connected through a pivot pin 60 to one end of a connecting link 62 which is pivotally connected at 64 to a transverse frame member 66 of the frame means 12. The outer end of the extendable piston rod 58a of cylinder 58 is pivotally connected through a pivot pin 68 to and between the outer ends of a pair of spaced radial arms 70 fixed to the rockshaft 52 in transverse relation thereto. A link 72 has its opposite ends pivotally connected, respectively, through a pivot pin 74 to the radial arms 70 and to the pivot axis 60 on the connecting link 62.

The cylinder or ram 58 is connected in a fluid pressure circuit through fluid pressure flow lines (not shown) which are connected through suitable fittings to the piston and rod ends of the cylinder and extend forwardly of the implement for connection to a suitable source of fluid pressure (not shown) such as a hydraulic pump and associated reservoir normally found on conventional tractors and other draft vehicles used to pull such implements. The fluid pressure lines are connected to the fluid pressure source through a conventional main fluid pressure control valve (not shown) which enables the operator to select a desired actuating mode for the cylinder 58 so as to extend and retract its piston rod 58a to effect a corresponding raising and lowering of the transport wheels 44 and thereby selectively effect a corresponding lowering and raising of the frame means and associated ground working tools, as is known. While the implement 10 is illustrated with a single wheel actuating cylinder or ram 58, it will be appreciated that more than one wheel actuating cylinder may be employed if desired.

The agricultural implement 10 includes control mechanism, indicated generally at 80, which is operatively associated with the transport wheels 44 and the tool support bars 36a,b so as to effect predetermined rotation of the tool bars when the transport wheels are moved between their lowered and raised positions. Very generally, the control mechanism 80 includes first linkage means, indicated generally at 82, which interconnects the tool bar 36a to the transport wheels 44 through the rockshaft 52 so that movement of the transport wheels from their lowered to their raised positions effects predetermined rotation of the tool bar 36a in a predetermined rotational direction. As will be described, the first linkage means 82 serves to maintain the spring teeth 40a,b in set position during ground working.

The control mechanism 80 includes second linkage means, indicated generally at 84, which interconnects the rear tool support bar 36b to the transport wheels 44 so that movement of the transport wheels from their lowered to their raised positions is inoperative to effect rotation of the tool bar 36b through the control linkage means 84. The second linkage means 84 is operative to effect positive predetermined rotation of the tool support bar 36b when the transport wheels are moved from their raised to their lowered positions, such predetermined rotation effected by the second linkage means 84 being in a direction opposite to the predetermined rotational direction given to the tool bar 36a by the first linkage means 82 when the transport wheels are moved from their lowered to their raised positions.

The control mechanism 80 further includes third linkage means, indicated generally at 86, which directly interconnects the tool bars 36a,b so that positive rotation of either of the tool bars effects rotation of the other tool bar in a corresponding rotational direction and magnitude.

Turning now to a more detailed description of the first, second and third linkage means of the control mechanism 80, and with particular reference to FIG. 3 taken in conjunction with FIGS. 2 and 4, the first linkage means 82 includes a connector plate in the form of a plurality of closely spaced identically shaped connector plates which in the illustrated embodiment comprise two connector plates 90a and 90b fixedly mounted on the tool support bar 36a through a suitable mounting bracket 92 so that connector plates 90a,b lie in parallel planes transverse to the axis of the tool bar 36a, as illustrated in FIG. 2. The connector plates 90a,b may be generally triangular in side profile configuration and have coplanar outer straight edge surfaces 94 adjacent to which a plurality of circular equidistantly spaced openings or bores 96 are formed so that the openings 96 in the spaced connector plates are axially aligned and have coplanar axes.

The first linkage means 82 also includes a pair of actuator links 100 and 102 which comprise elongated rigid actuator links of generally rectangular transverse cross section. The actuator link 100 is pivotally connected at its rearward end through a pivot pin 104 to and between a pair of parallel spaced pivot plates or brackets 106a,b which are fixedly mounted in normal relation to the rockshaft 52 for rotation therewith. The forward end of the actuator link 100 has a longitudinally extending elongated slot 100a formed therethrough which forms a lost motion pivot connection with a pivot or connecting pin 108 releasably mounted within a selected pair of aligned openings or bores 96 in the connector plates 90a,b. In the illustrated embodiment, the connector plates 90a,b have eleven openings or bores 96 spaced along their straight edges 94, and FIGS. 1 and 3 illustrate the connecting pin 108 mounted within the middle set of openings. In this position, the connecting pin 108 is disposed intermediate the length of the elongated slot 100a in actuator link 100 when the transport wheels are in their lowered transport positions.

As will become more apparent hereinbelow, the intermediate position of the connecting pin 108 in the connector plates 90a,b as shown in FIGS. 1 and 3 results in rotational movement of the tool bar 36a and associated spring teeth 40a to a rotational position approximately one-half of the maximum extent of rotation that may be effected when the connecting pin 108 is in the lowermost set of openings in the connector plates, identified at 96a in FIG. 3. During operation, the actuator link 100 undergoes axial tension and effects positive rotation of the connector plates 90a and associated tool bar 36a in a counterclockwise direction, as considered in FIGS. 1 and 3, when the transport wheels 44 are moved from their lowered transport positions to their raised positions.

The actuator link 102 has its rearward end pivotally connected to and between the pivot plates 106a,b through a pivot pin 112. The forward end of the actuator link 102 has a longitudinally extending elongated slot 102a formed therein which forms a lost motion pivot connection with the connector plates 90a,b through the connecting pin 108. With the connecting pin 108 secured within the intermediate opening 96 in the connector plates 90a,b the connecting pin 108 is disposed at approximately midlength of the elongated opening 102a in the actuator link 102. As will be described more fully hereinbelow, the actuator link 102 establishes a predetermined rotational limit for rotation of the connector plates 90a,b and the tool bar 36a when the transport wheels 44 are moved from their lowered to their raised positions.

The second linkage means 84 includes a control link 116 which is pivotally connected at one end through a pivot pin 118 to and between a pair of closely spaced pivot plates 120a and 120b suitably fixed to the rockshaft 52 in normal relation thereto so as to be rotatable with the rockshaft. The end of the control link 116 opposite its pivotal connection 118 to the pivot plates 120 has a longitudinally extending elongated slot 116a which forms a lost motion pivot connection through a pivot pin 122 to a pair of parallel spaced pivot plates 124a and 124b which are fixed in normal relation on the tool support bar 36b through a suitable mounting bracket 126, as illustrated in FIG. 2. In operation, the control link 116 is inoperative to effect rotation of the associated tool bar 36b when the transport wheels 44 are moved from their lowered transport positions to their raised positions due to the lost motion connection between the control link 116 and the tool bar 36b. However, the length of the lost motion slot 116a is such that when the transport wheels 44 are in their raised positions, and the tool bars 36a,b and associated spring teeth 40a,b have been rotated to predetermined rotational positions for ground working by the first linkage means 82, returning the transport wheels from their raised to their lowered positions causes the lowermost end of the lost motion slot 116a to engage the pivot pin 122 and effect a clockwise rotation of the tool bar 36b so as to positively return it and the associated spring teeth 40b to their raised non-operating positions.

The third linkage means 86 comprises a rigid elongated connecting link 128 which is pivotally connected at its forward end through a pivot pin 130 to and between a pair of parallel spaced pivot or connecting plates 132a,b fixed on the forward tool bar 36a through a suitable mounting bracket 134. The rearward end of the connecting link 128 is pivotally connected through a pivot pin 136 to and between a pair of pivot plates 138a and 138b which are fixedly mounted on the rear tool bar 36b through a mounting bracket 140 in similar fashion to the mounting bracket 134. The connecting link 128 serves to interconnect the tool bars 36a,b so that rotation of either of the tool bars effects a corresponding rotation of the other tool bar in the same rotational direction and, in the illustrated embodiment, through an equal rotational angle.

With particular reference to FIGS. 3 and 4, the geometry of the actuator links 100 and 102, the control link 116 and the radial pivot arms defined by the pivot plates 132a,b and 138a,b are such that when the transport wheels 44 and associated rockshaft 52 are in transport positions, the control link 116 maintains the rear tool bar 36b and associated spring teeth 40b in predetermined retracted positions, as shown in FIG. 3 which, through the connecting link 128, also maintains the front tool bar 36a and associated spring teeth 40a in the same orientation.

In accordance with one feature of the invention, the elongated slots 100a and 102a in the actuator links 100 and 102, respectively, are such that with the tool bars 36a and 36b maintained in their retracted rotational positions by the control link 116, the connector pin 108 is loose in the slots 100a and 102a thereby allowing the connecting pin 108 to be readily placed within any selected pair of the openings 96 so as to change the extent of rotation and thus the depth of penetration effected by the spring teeth 40a,b when rotated to ground penetrating position upon raising of the transport wheels from their lowered to their raised positions. As aforementioned, with the corresponding pin 108 in the intermediate set of openings 96, the spring teeth 40a,b will be rotated to rotational positions intermediate their maximum and minimum rotational positions. Connection of the actuator links 100 and 102 to the connector plates 90a,b with the connector pin 108 in the lowermost aligned openings 96a, as shown in FIG. 4, effects maximum spring tooth penetration during ground working operation, while connection of the actuator links 100 and 102 to the connector plates 90a,b by locating the connector pin 108 in the uppermost openings 96b effects minimum depth penetration of the spring teeth during operation.

Movement of the transport wheels 44 from their lowered transport positions to their raised positions through retraction of the piston rod 58a of cylinder or ram 58 effects rotation of the pivot plates 106a,b through engagement of the forwardmost end of the elongated slot 100a in the actuator link 100 with connector pin 108 so as to effect counterclockwise rotation of the tool bars 36a,b and associated spring teeth 40a,b. The rearward end of the elongated slot 102a in the actuator link 102 is located so that when the transport wheels 44 are in their raised positions, the actuator link 102 prevents the spring teeth from rotating beyond the rotation imparted to them by the actuator link 100, it being understood that the connecting link 128 effects a corresponding rotational limitation on the rear tool bar 36b and associated spring teeth 40b. At this point, the pivot pin 122 is loose within the lost motion slot 116a in the control link 116. During ground working operation, the connecting pin 108 is captured between the rearward end of slot 102a in actuator link 102 and the forward end of slot 100a in actuator link 100 so that any reaction forces acting on the spring teeth 40a,b are opposed by the actuator link 100 and place link 100 in axial tension.

When again lowering the transport wheels 44 from their raised to their lowered transport positions, clockwise rotation of the rockshaft 52 and the pivot plates 120a,b causes the pivot pin 122 to be engaged by the lower end of the lost motion slot 116a in control link 116 so that the control link 116 effects a positive force on the pivot plate 124a,b to rotate the tool bar 36b and spring teeth 40b, as well as the forward tool bar 36a and associated spring teeth 40a, in clockwise directions as considered in FIGS. 3 and 4.

The length of the elongated slot or opening 100a in actuator link 100 is such that the rearward end of the slot does not engage connecting pin 108 during movement of the transport wheels from their raised to their lowered positions. The radial distance of the pivot pin 118 from the axis of the rockshaft 52 is greater than the radial distance of the pivot pin 112 from the axis of the rockshaft so that the control link 116 engages the pivot pin 122 and effects clockwise rotation of the tool bars 36a,b and associated spring teeth prior to any substantial axial compression force being exerted on the actuator link 102 during lowering of the transport wheels.

Thus, in accordance with the present invention, a control mechanism is provided for effecting predetermined rotation of the tool bars 36a,b and associated spring teeth 40a,b during raising and lowering of the transport wheels relative to an implement frame wherein the linkages of the control mechanism which interconnect the transport wheels to the tool bars are in tension as they effect rotation of the tool bars. The first linkage means comprising the actuator links 100 and 102 serves to positively maintain the spring teeth 40a,b in set position during ground working operation, with the actuator links 100 and 102 having cooperation with the control link 116 to maintain the connector pin 108 in floating relation within the slots 100a and 102a in links 100 and 102, respectively, when the transport wheels are in their lowered transport positions, thus enabling the connecting pin 108 to be readily inserted in a selected pair of the aligned openings 96 so as to vary the depth of penetration of the spring teeth during operation.

While a preferred embodiment of the present invention has been illustrated and described, it will be understood that changes and modifications may be made therein without departing from the invention in its broader aspects. Various features of the invention are defined in the following claims.

What is claimed is:

1. An agricultural implement comprising, in combination, a frame, at least two tool bars supported by said frame for rotation about their longitudinal axes and each carrying at least one ground working tool thereon for movement therewith, wheel means mounted on said frame and movable between a lowered transport position wherein said frame and ground working tools are raised for transport and a raised position wherein said frame and ground working tools are lowered for ground working operation, operator means operatively associated with said wheel means and adapted to move said wheel means between its said lowered and raised positions, and a control mechanism operatively associated with said wheel means and said tool bars so as to effect predetermined rotation of said tool bars when said wheel means is moved between its said lowered and raised positions, said control mechanism including first linkage means interconnecting one of said tool bars to said wheel means so that movement of said wheel means from its said lowered to its said raised positions effects rotation of said one of said tool bars in a predetermined direction, second linkage means interconnecting the other of said tool bars to said wheel means so that movement of said wheel means from its said lowered to its said raised positions is inoperative to effect rotation of said other of said tool bars through said second linkage means, while movement of said wheel means from its said raised to its said lowered positions is operative to effect rotation of said other of said tool bars through said second linkage means in a direction opposite to said predetermined direction, and third linkage means directly interconnecting said tool bars so that rotation of either of said tool bars effects a corresponding rotation of the other of said tool bars, wherein said first linkage means includes a connector plate mounted on said one of said tool bars for movement therewith, and a pair of actuator links pivotally connected to said connector plate and interconnecting said connector plate to said wheel means, and, wherein each of said actuator links has lost motion connection with said connector plate, one of said actuator links being adapted to effect rotation of said connector plate and said one of said tool bars in said predetermined rotational direction in response to movement of said wheel means from its said lowered to its said raised positions, and the other of said actuator links being adapted to limit the extent of said rotation of said one of said tool bars in said predetermined rotational direction.

2. An agricultural implement as defined in claim 1 including a rockshaft supported by said frame for rotation about its longitudinal axis, said wheel means including at least one pair of transversely spaced transport wheels supported on said rockshaft, said operator means being operatively associated with said rockshaft and operable to effect rotation thereof so as to move said transport wheels between said lowered transport position and said raised position, said actuator links being pivotally connected to said rockshaft so as to undergo longitudinal movement in response to rotation of said rockshaft.

3. An agricultural implement as defined in claim 1 wherein said second linkage means includes a control link defining a lost motion connection between said transport wheel means and said other of said tool bars.

4. An agricultural implement as defined in claim 1 wherein said connector plate includes means enabling variable adjustment of the connection of said actuator links to said connector plate so as to facilitate adjustment of the extent of rotation of said tool bars in said predetermined direction upon movement of said wheel means from its said lowered to its said raised positions.

5. An agricultural implement as defined in claim 4 wherein said lost motion connections of said actuator links to said connector plate are defined by a common connecting pin releasably cooperative with said connector plate and said actuator links, said second linkage means being cooperative with said other of said tool bars and said third linkage means so that said connecting pin may be freely removed from said connector plate when said wheel means is in its said lowered position thereby facilitating selective adjustment of said connector plate relative to said actuator links.

6. An agricultural implement as defined in claim 4 wherein said actuator links include a first actuator link interconnecting said wheel means to said connector plate so as to be placed in axial tension and effect said rotation of said one of said tool bars when said wheel means is moved from its said lowered so its said raised positions, and a second actuator link interconnecting said wheel means to said connector plate so as to limit the extent of said rotation as said wheel means reached its said raised position.

7. An agricultural implement comprising, in combination, frame means adapted to be attached to a draft vehicle, a rockshaft mounted on said frame means in transverse relation thereto for rotation about its longitudinal axis, wheel means mounted on said rockshaft for movement therewith, actuator means operatively associated with said rockshaft and operative to effect movement of said wheel means between a lowered transport position wherein said frame means is in a raised position relative to ground and a second position wherein said frame means is in a lowered position relative to ground, at least two tool bars mounted on said frame means in transverse relation thereto for rotation about their longitudinal axes, each of said tool bars supporting at least one ground working tool thereon for movement therewith, first linkage means operatively associated with one of said tool bars and said rockshaft and operative to effect predetermined rotation of said one of said tool bars when said wheel means is moved from its said lowered to it said raised positions, second linkage means operatively associated with the other of said tool bars and said rockshaft and being inoperative to rotate said other of said tool bars when said wheel means is moved from its lowered to its raised positions but being operative to rotate said other of said tool bars in a direction opposite to said predetermined rotation when said wheel means is moved from its raised to its lowered position, and third linkage means directly interconnectng said tool bars so that rotation of both of said tool bars is effected in response to rotation of either of said tool bars by said first or second linkage means in response to movement of said wheel means, wherein said first linkage means includes a pair of actuator links, and a connector plate mounted on said one of said tool bars in normal relation thereto, said actuator links each being pivotally connected to said rockshaft and having lost motion connection with said connector plate in a manner so that movement of said wheel means from its said lowered to its said raised positions places one of said actuator links in tension and effects said predetermined rotation of said one of said tool bars, the other of said actuator links being operative to limit the extent of said predetermined rotation of said one of said tool bars when said wheel means is moved to its said raised position.

8. An agricultural implement as defined in claim 7 wherein said connector plate includes means enabling variable adjustment thereof relative to said actuator links so as to vary the extent of said predetermined rotation of said tool bars.

9. An agricultural implement as defined in claim 8 wherein said second linkage means comprises a control link pivotally connected to said rockshaft and having lost motion connection with said other of said tools bars so as to effect positive rotation of said other of said tool bars in a direction opposite to said predetermined rotational direction when said wheel means is moved from its said raised to its said lowered positions, said control link being adapted to maintain said tool bars in predetermined positions when said wheel means is in its said lowered position.

10. An agricultural implement as defined in claim 9 wherein said means enabling variable adjustment of said connector plate relative to said actuator links comprises a plurality of spaced openings in said connector plate and a connecting pin releasably insertable in said openings, said control link being operative to maintain said connecting pin in a loose condition relative to said connector plate and said actuator links when said wheel means is in its said lowered position so as to facilitate ready adjustment of said connector pin between different ones of said openings.

* * * * *